United States Patent

Kambe et al.

[11] Patent Number: 5,865,162
[45] Date of Patent: Feb. 2, 1999

[54] WIRE SAW AND WORK SLICING METHOD

[75] Inventors: Takashi Kambe; Yukihiro Kanemichi; Yasuhiro Itou; Akio Kawakita; Shigeo Kobayashi, all of Kanagawa, Japan

[73] Assignee: Nippei Toyama Corporation, Tokyo, Japan

[21] Appl. No.: 840,628

[22] Filed: Apr. 25, 1997

[30] Foreign Application Priority Data

Apr. 27, 1996 [JP] Japan .................................... 8-131395
Nov. 26, 1996 [JP] Japan .................................... 8-315102

[51] Int. Cl.⁶ .......................................................... B28D 1/08
[52] U.S. Cl. .......................................... 125/16.02; 125/21
[58] Field of Search ........................ 83/651.1; 125/16.01, 125/16.02, 21

[56] References Cited

U.S. PATENT DOCUMENTS

| | | | |
|---|---|---|---|
| 1,662,488 | 3/1928 | Burkhardt | 125/21 |
| 3,831,576 | 8/1974 | Mech | 125/21 X |
| 4,191,159 | 3/1980 | Frosch et al. | 125/21 |
| 4,494,523 | 1/1985 | Wells | 125/21 X |
| 4,574,769 | 3/1986 | Ishikawa et al. | 125/21 X |
| 4,655,191 | 4/1987 | Wells et al. | 125/21 X |
| 5,269,285 | 12/1993 | Toyama et al. | 125/16.01 |
| 5,564,409 | 10/1996 | Bonzo et al. | 125/16.02 X |

OTHER PUBLICATIONS

Patent Abstracts of Japan vol. 017, No. 106 (M–1375), Mar. 4, 1993, & JP 04 294973 A (Nippon Steel Corp), Oct. 19, 1992 *Abstract.

Primary Examiner—Timothy V. Eley
Attorney, Agent, or Firm—Sughrue, Mion, Zinn, Macpeak & Seas, PLLC

[57] ABSTRACT

In a wire saw, it is an object to reduce the variance in width of cut slices of a work as well as the degree of coarseness of the cut slices. A plurality of machining rollers 13 and 14 are arranged in parallel at prescribed intervals, and a large number of circular grooves 13*a* and 14*a* are formed on the outer periphery of each of the rollers. In an axial direction of the machining rollers 13 and 14, a plurality of supply reels 23, take-up reels 24 and wires 15A, 15B are arranged. The wires 15A, 15B supplied from the supply reels 23 are wound on the circular grooves 13*a* ad 14*a* of the plurality of machining rollers 13 and 14 so that they are travelled between the plurality of rollers 13 and 14, and taken up by the take-up reels 24. The work 20 is cut/sliced by a lapping operation of abrasive grains contained in the slurry which are supplied on the respective sets of wires 15A and 15B which travel between the plurality of machining rollers 13 and 14 in a longitudinal direction over respective halves of the rollers.

17 Claims, 10 Drawing Sheets

WIRE SAW AND WORK SLICING METHOD

BACKGROUND OF THE INVENTION

The present invention relates to a wire saw used to cut an ingot-shape work of brittle material such as semiconductor material, magnetic material, ceramic, etc. simultaneously into a plural of sheets each having a prescribed thickness, and a work slicing method using it.

In a previously known wire saw of this kind, plural rollers for machining are arranged in parallel at prescribed intervals, and on the outer periphery thereof, plural strips of circular grooves are arranged with a prescribed pitch. A supply reel and a take-up reel in a pair, separated from the above machining rollers, are arranged oppositely to each other. A strip of wire supplied from the supply reel is wound on the circular grooves of each roller and travelled among these rollers. Thereafter, it is wound by the take-up reel. A slurry containing free abrasive grains is supplied to the wire travelling among the plural machining rollers so that the work is sliced into wafers each having a prescribed thickness by the lapping operation of the abrasive grains. Thus, the wafers are cut out.

In the above conventional wire saw, however, a strip of wire is continuously wound from the circular groove at the one end to that at the other end on the outer periphery of each machining roller. Therefore, the wire is shifted successively from the circular groove at the one end of the roller to that at the other end thereof in accordance with the rotation of the machining roller. Then, the wire is gradually abraded to become thin so that the thickness of the sliced work varies between the inlet side of the machining roller and the outlet side thereof.

When the wire becomes gradually slender during the shift of the wire from the one end of the roller to the other end thereof, the application degree of free abrasive grains for the wire is reduced. Thus, the cutting capability is gradually reduced from the one end of the machining roller to the other end thereof. The cutting plane of the work becomes gradually coarse.

The slicing speed of the work inclusive of the travelling speed of the wire must be set in accordance with the low cutting capability of the wire at the other end of the roller. Therefore, the slicing speed of the work cannot be accelerated so that it takes a long time to cut/slice the entire work.

In addition, in a wire saw developed recently, in order that a large number of wafer sheets are cut out simultaneously, the wire is likely to be thick and long. For the machining of the long work, the length of the machining roller in an axial length must be large to increase the number of the circular grooves. In this case, a single wire cuts out a large number of wafers so that the abrasion degree of the wire is further increased. Thus, the variation in the cutting thickness of the work, cutting capability and coarseness of the cutting plane becomes worse remarkably between the one end of the roller and the other end thereof.

Further, since the wire saw developed in recent years is required to cut a long work into many wafers simultaneously, the machining roller having longer lengths in the axial direction have been employed. However, if the machining roller becomes too long, when the work is cut/sliced, it becomes hot due to friction between the machining roller and wire. This may provide great thermal distortion in the roller, and a large fluctuation in the pitch of the circular grooves. The work cannot be cut into wafers each having a prescribed thickness with a high precision.

SUMMARY OF THE INVENTION

The present invention has been accomplished in view of the problem of the above conventional technique.

It is an object of the present invention to provide a wire saw and a work slicing method which can cut out a large number of wafers from a length work simultaneously with a high precision.

In addition, it is the other object of the present invention to provide a wire saw and a work slicing method which can reduce the variance in the cutting thickness of the work along the length of the work.

Further, it is another object of the present invention to provide a wire saw which can suppress the cutting capability and the coarseness of a cutting plane from varying between the one end of the machining roller and the other end of thereof.

Furthermore, it is still another object of the present invention to provide a wire saw which can accelerate the slicing speed of the work to shorten the time required to cut/slice the entire work.

In order to attain the above object, the present invention is provided as recited in each of claims.

The above-mentioned object can be attained by a wire saw according to a first aspect of the present invention comprising: a plurality of wires each supplied from a supply reel and taken up by a take-up reel; a plurality of machining rollers each having the outer periphery having a plurality of circular grooves on which one of the wires is wound, the one of the wires being traveled between the machining rollers; and a slurry supplying means for supplying a slurry containing abrasive grains onto the wires which are traveled; wherein a single work is cut through a lapping operation of the abrasive grains, and a plurality of flows of wires are provided to effect a cutting operation simultaneously.

Accordingly, the single work is cut-machined by a lapping operation of abrasive grains contained in the slurry which are supplied on a plurality of wires travelling while the cutting load is shared by prescribed amounts in a longitudinal direction by the wires. Therefore, the degree of coarse of the cutting plane of the work and the cutting pitch are not varied.

In addition, in the wire saw according to the present invention, the arrangement pitch of circular grooves for each of the machining rollers may be varied between the one end and the other end of each of the machining rollers in an axial direction of the each of the machining rollers.

Further, in the wire saw according to the present invention, the arrangement pitch of the circular grooves for each of the machining rollers may be varied continuously in an axial direction of the each of the machining rollers.

Furthermore, in the wire saw according to the present invention, the arrangement pitch of the circular grooves for each of the machining rollers may be varied stepwise for each of prescribed intervals in an axial direction of the each of the machining rollers.

According to the wire saw as described above, between the inlet and outlet of the wire of each set, the cutting thickness of the work is not varied greatly.

The above-mentioned object can also be attained by a work slicing method using a wire saw according to a second aspect of the present invention which comprises: a plurality of wires each supplied from a supply reel and taken up by a take-up reel; a plurality of machining rollers each having the outer periphery having a plurality of circular grooves on which one of the wires is wound in such a manner that the one can be traveled between the machining rollers; and a slurry supplying means for supplying a slurry containing abrasive grains onto the wires which are traveled in such a manner that a single work is cut through a lapping operation of the abrasive grains, the work slicing method comprising the steps of:

cutting the single work while a plurality of flows of wires are being traveled simultaneously.

The above-mentioned object can also be attained by a wire saw according to a third aspect of the present invention comprising: a wire wound with a prescribed pitch between a plurality of machining rollers; and a slurry supplying means (125) for supplying a slurry containing abrasive grains onto the wires which are traveled; wherein a plurality of sets of groups of the plurality of machining rollers are arranged in parallel in an axial direction of the work in opposition to the work.

In the wire saw according to the third aspect of the present invention, while a wire is travelled by a plural sets of roller groups, a work is pushed into contact with the wire while the wire is travelled so that it is cut/sliced in slices. Therefore, even when the work is long, it can be simultaneously cut/sliced by the plurality of sets of roller groups in their sharing manner. The machining rollers in each roller group can be shortened. There is no fear of generating great thermal distortion in each of the machining rollers. Thus, the wafer having a prescribed thickness can be cut with a high precision.

In the wire saw according to the third aspect of the present invention, a plurality of wires may be individually wound around the plurality of sets of roller groups.

In addition, in the wire saw according to the third aspect of the present invention, a single wire may be wound over the plurality of sets of roller groups Further, in the wire saw according to the third aspect of the present invention, the diameter of the end of said machining roller may be made smaller than that of the center thereof.

DETAILED DESCRIPTION OF THE PREFERRED EMBODIMENTS

Now referring to FIGS. 1 and 2, the first embodiment will be explained.

Figure 1:
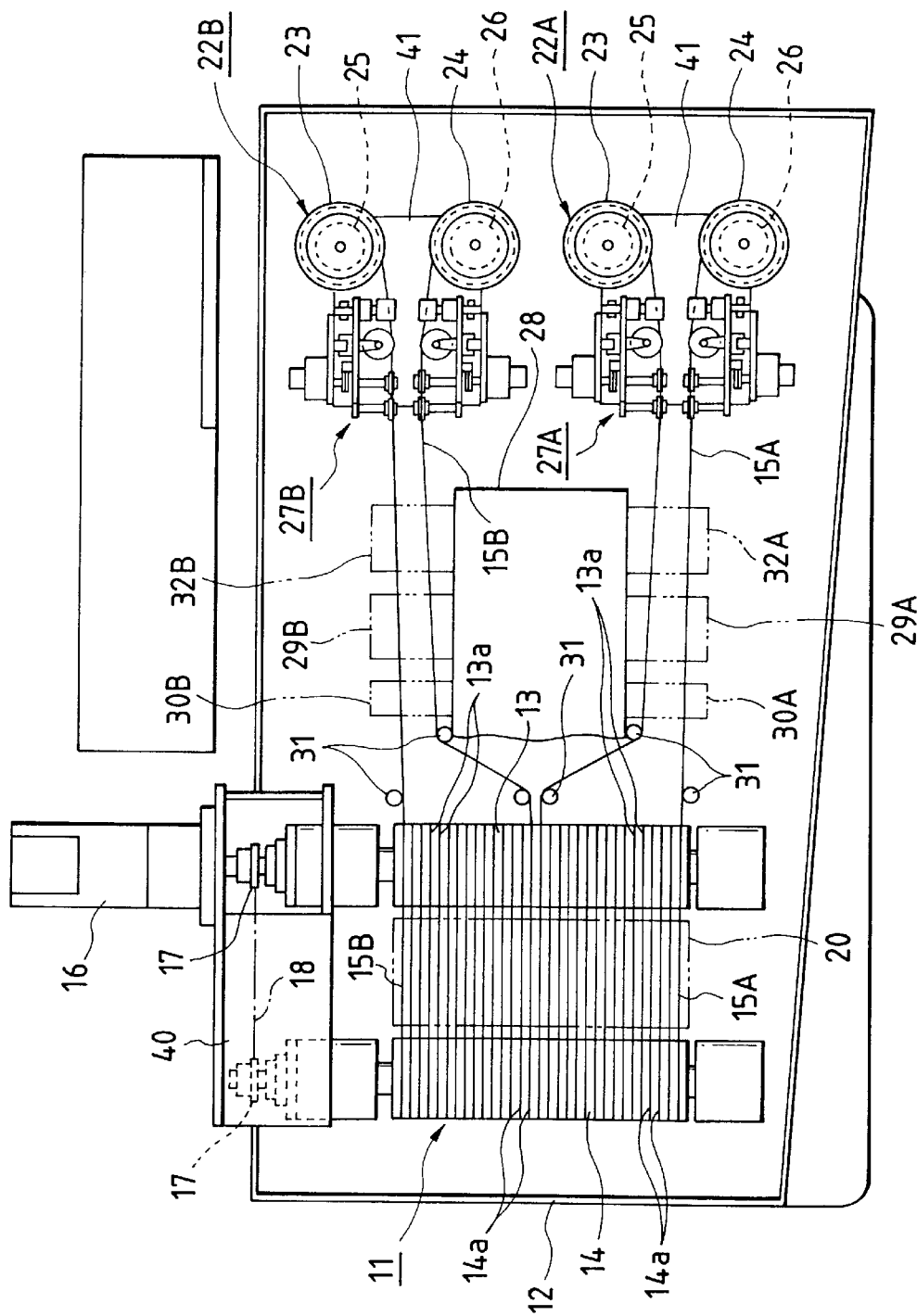
FIG. 1 is a schematic plane view of the first embodiment of the wire saw according to the present invention.
Figure 2:
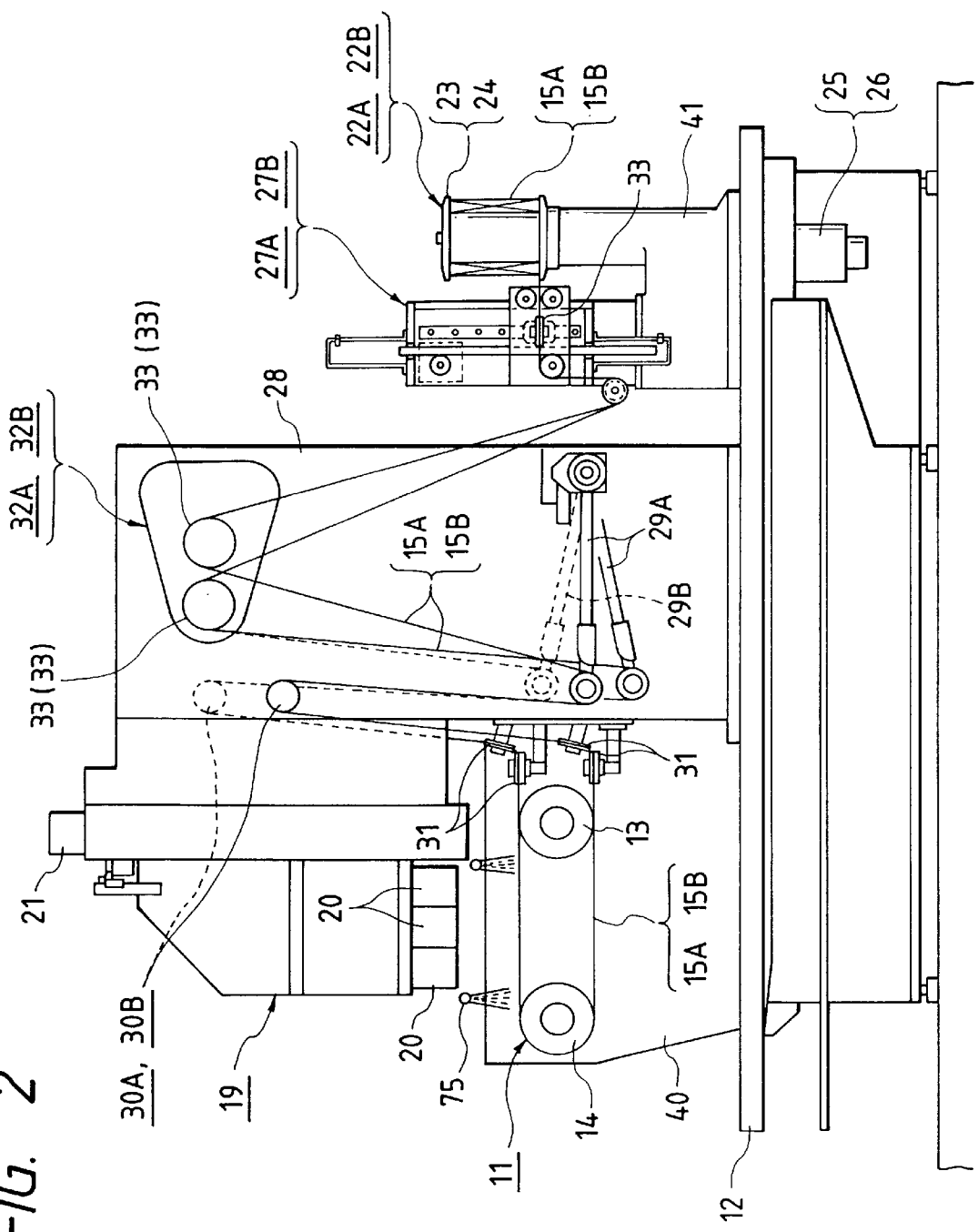
FIG. 2 is a front view of the wire saw.

As seen from FIGS. 1 and 2, a cutting mechanism 11 is mounted on a bed 12. The cutting mechanism 11 includes a machining driving roller 13 and a machining sub-roller 14 extending in parallel. On the outer periphery thereof, circular grooves 13a and 14a are formed at a prescribed pitch. In this embodiment, although two machining rollers are provided, three or four rollers may be provided. For easy understanding of the drawings, the circular grooves 13a and 14a having the number smaller than in an actual case are illustrated.

Wires 15A and 15B which are supplied from different sources, respectively are wound continuously and spirally on each of the circular grooves 13a, 14a of the front half and rear half of each of the machining rollers 13 and 14. A roller driving motor 16 is arranged in a frame 40 placed upright on the bed 12. The driving roller 13 is directly driven by the motor 16 and the sub-roller 14 is driven by the travelling force of the wires 15A and 15B. The rotation of the machining rollers 13 and 14 permits the wires 15A and 15B to travel at a prescribed speed unidirectionally or bidirectionally.

A work supporting mechanism 19 is supported to be movable vertically above the cutting mechanism 11. Below the supporting mechanism 19, a work 20 of brittle material is set removably by a clamping means not shown. A work rising/falling motor 21 is placed in a column 28 arranged upright on the bed 12. The motor 21 serves to move the work supporting mechanism 19 up and down through a ball screw (not shown) and others. Above the wires 15A and 15B between the machining rollers 13 and 14, a slurry supplying mechanism 75 for supplying slurry containing abrasive grains is provided.

In the operation of the wire saw, while each of the wires 15A and 15B is travelled between the machining rollers 13 and 14 of the cutting mechanism 11, the work supporting mechanism 19 is lowered towards the cutting mechanism 11. Then, a slurry containing free abrasive grains is supplied to each of the wires 15A and 15B, and the work 20 is pushed into contact with the wires 15A and 15B so that the work 20 is sliced by the lapping operation of the abrasive grains.

Two sets of reel mechanisms 22A and 22B are arranged in parallel in an axial direction of the machining rollers 13 and 14 on the bed 12. Each set of reel mechanism includes a supply reel 23 for supplying the wires 15A and 15B and a take-up reel 24 for taking up them. Two pairs of reel rotating motors 25 and 26 which may be servo-motors capable of varying the rotary speed and rotary direction are mounted on a bed 12. Reels 23 and 24 which are rotatably held in the frame 41 are coupled with the motor shafts of these motors 25 and 26. Although take-up and supply of the wires 15A and 15B are actually carried out alternately, for convenience of explanation, it is now assumed that the supply reel 23 and the take-up reel 24 are given for this purpose.

Traverse mechanisms 27A and 27B which are adjacent to the reel mechanisms 22A and 22B, respectively are mounted on the frame 41. The traverse mechanisms 27A and 27B guide the supply of the wires 15A and 15B from the supply reel 23 and take-up of the wires 15A and 15B on the take-up reel 24 while traversing them vertically.

The wires 15A and 15B are supplied from the supply reel 23 to the cutting mechanism 11 by the rotation of both reels 23 and 24 of each of the reel mechanisms 22A and 22B, and the wires 15A and 15B after machined are taken up by the reel 24. After the wires 15A and 15B are supplied by a predetermined length (e.g. 10 meters), the rotary motors 25 and 26 are reversed so that the wires 15A and 15B are supplied from the take-up reel 24 and taken up by a predetermined length (e.g. 9 meters) by the supply reel 23. Such a repetitive operation is continued so that the wires 15A and 15B advance stepwise as a whole.

Within the column 28 provided upright on the bed 12, two sets of tension imparting mechanisms 29A and 29B and guiding mechanisms 30A and 30B are mounted on the front face and rear face so as to be located between the reel mechanisms 22A, 22B and the cutting mechanism 11. Each of the tension imparting mechanisms 29A and 29B includes a pair of counter weights. Both ends of each of the wires 15A and 15B wound between the machining rollers 13 and 14 of the cutting mechanism 11 are hung on the tension imparting mechanisms 29A and 29B through the guiding mechanisms 30A and 30B and each of the guide rollers 31. In this state, the tension imparting mechanisms 29A and 29B imparts a predetermined tension to the wires 15A and 15B between the machining rollers 13 and 14.

Tension reducing mechanisms 32A and 32B are mounted on the front face and rear face of the column 28 so as to be located between the reel mechanisms 22A, 22B and the tension imparting mechanisms 29A, 29B. Each tension reducing mechanism is provided with a pair of rotary rollers 33, 33 so as to correspond to the wire supplying side and the wire take-up side. The wires 15A and 15B are hung on the these rotating rollers. When the pair of rotating rollers 33 rotate, the tension exerted from the tension imparting mechanisms 29A, 29B on the reels 23, 24 of each of the reel mechanisms 22A and 22B is reduced.

In this wire saw, two flows of wires 15A and 15B are supplied from the respective supply reels 23 of the reel mechanisms 22A and 22B and travelled reciprocatively in the front half and rear half between the machining rollers 13 and 14 of the cutting mechanisms. Thus, the wires are shifted stepwise and taken up by the corresponding take-up reels 24. While the slurry containing free abrasive grains are supplied to the wires 15A and 15B between the machining rollers 13 and 14, the work 20 is pushed into contact with the wires 15A and 15B by the work supporting mechanism 19. Thus, the work 20 is cut into wafers each having a prescribed thickness.

This embodiment can provide the following meritorious effects.

(a) In the wire saw according to this embodiment, two flows of reel mechanisms 22A and 22B are arranged in a longitudinal direction of machining rollers 13 and 14. The two flows of wires 22A supplied from the respective supply reels 23 of the reel mechanisms 22A and 22B are wound on the circular grooves 13a and 14a on the front half and rear half of the machining rollers 13 and 14 and thereafter taken up by the take-up reels 24.

Thus, the two flows of wires 15A and 15B travelling between the machining rollers can share to cut the front half and rear half of a single work 20 in its longitudinal direction. Therefore, while the wires 15A and 15B are shifted from the one end to the other end of the machining rollers 13 and 14, they are not greatly abraded to become slender. For this reason, the cutting thickness of the work 20 can be suppressed from varying between the wire inlet and wire outlet of the machiningrollers 13 and 14. The work can be machined with a uniform cutting thickness of a wafer with a high precision.

(b) In the wire saw according to this embodiment, as described above, the single work is cut-machined so that the front half and rear half thereof are shared by the two flows of wires 15A and 15B. Therefore, while the wires 15A and 15B are shifted from the one end to the other end of the machining rollers 13 and 14, they are not greatly abraded to become slender. For this reason, the application of free abrasive grains on the outer periphery thereof can be maintained substantially constant. The cutting capability and plane coarse degree of the cutting plane can be suppressed from being varying between the one end and other end of the machining rollers 13, 14, thereby permitting the work to be sliced with a high precision.

(c) As described above, the cutting capability does not vary greatly between the inlet and outlet of the machining rollers 13 and 14. For this reason, even when the slicing speed of the work 20 is set in accordance with the low cutting capability on the outlet side of each of the wires 15A and 15B, the slicing speed will not decrease greatly. Thus, the time required to cut/slice the entire work 20 can be shortened, thereby improving the machining capability.

Figure 3:
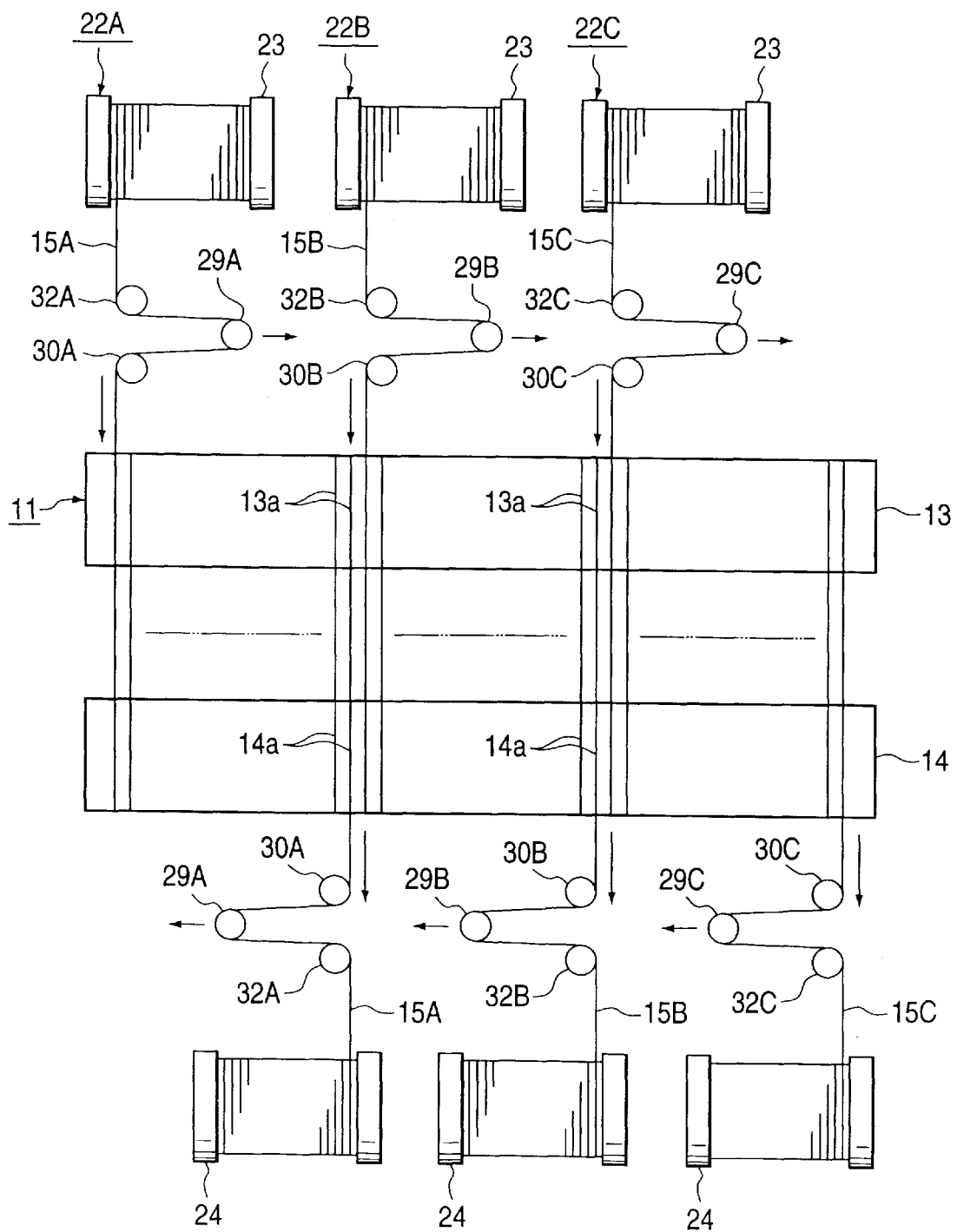
FIG. 3 is a schematic plane view of the second embodiment of the wire saw according to the present invention.

Referring to FIG. 3, an explanation will be given of the second embodiment of the present invention. Three flows of wires with the reel mechanisms 22A, 22B and 22C are arranged in parallel in an axial direction of the machining rollers 13 and 14 of the cutting mechanism 11. The three flows of wires 15A, 15B and 15C supplied from the respective supply reels 23 of the reel mechanisms 22A, 22B and 22C are wound on the circular grooves 13a and 14a at the respective front, intermediate and rear portions of the machining rollers 13 and 14 and thereafter taken up by the corresponding take-up reels 24.

Between the reel mechanisms 22A, 22B and 22C and the cutting mechanism 11 arranged are three sets of tension reducing mechanisms 32A, 32B and 32C, tension imparting mechanisms 29A, 29B and 29C, and guide mechanisms 30A, 30B and 30C. These mechanisms 29A–29C, 30A–30C and 32A–32C carry out the operation of tension imparting, travel guiding and tension attenuating for the three flows of wires 15A, 15B and 15C.

Therefore, according to the second embodiment, the single work is cut/sliced so that the front, intermediate and rear portion thereof in its longitudinal direction are shared by three flows of wires 15A, 15B and 15C. Thus, as in the first embodiment, the cutting capability and coarse degree of the cutting plane can be suppressed from being varying between the one end and other end of the machining rollers 13, 14.

Figure 4:
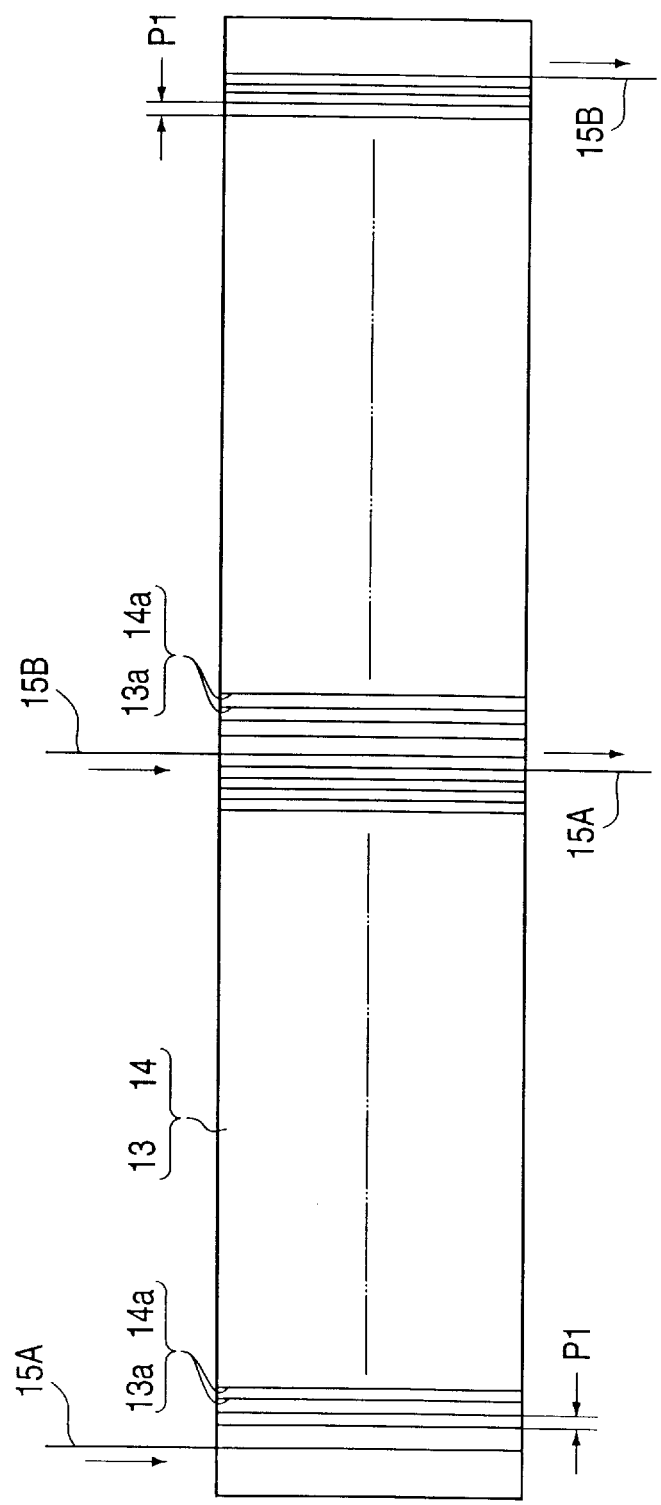
FIG. 4 is a plane view of the machining roller showing the third embodiment of the present invention.

Referring to FIG. 4, an explanation will be given of the third embodiment.

In the wire saw according to this embodiment, the arrangement pitch P1 of the circular groove 13A and 14a on the machining rollers 13 and 14 is formed to vary continuously in an axial direction of the rollers 13 and 14 between the inlet and outlet of each of the wires 15A and 15B. Specifically, the arrangement pitch P1 of the circular grooves 13a and 14a is formed so as to narrow gradually from the inlet side and outlet side of each of the wires 15A and 15B.

Therefore, while each of the wires 15A and 15B is shifted from the inlet side from the outlet side, it is abraded slightly to become slender. Even when the cutting thickness of the work 20 has an increasing tendency, the increasing amount of the cutting thickness will be canceled by a preset varying amount of the arrangement pitch P1 of the circular grooves 13a and 14a. Therefore, also between the one end and the other end of each of the wires 15A and 15B, the cutting thickness of the work 20 can be further suppressed from varying. Thus, in combination with the operation of cutting/slicing in a sharing manner by the two flows of wires 15A and 15B, the work 20 can be cut/sliced to have a more uniform thickness with a high precision.

Figure 5:
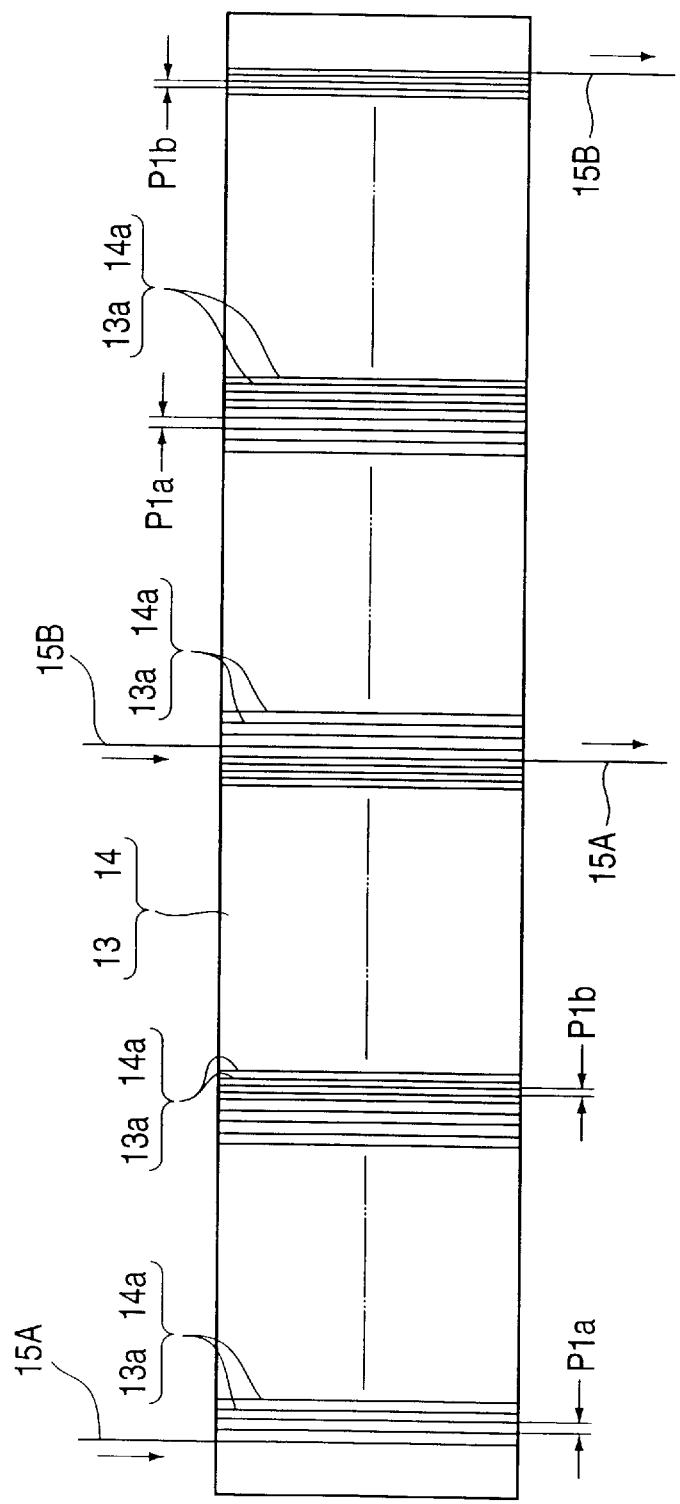
FIG. 5 is a plane view of the machining roller showing the fourth embodiment of the present invention.
Figure 6:
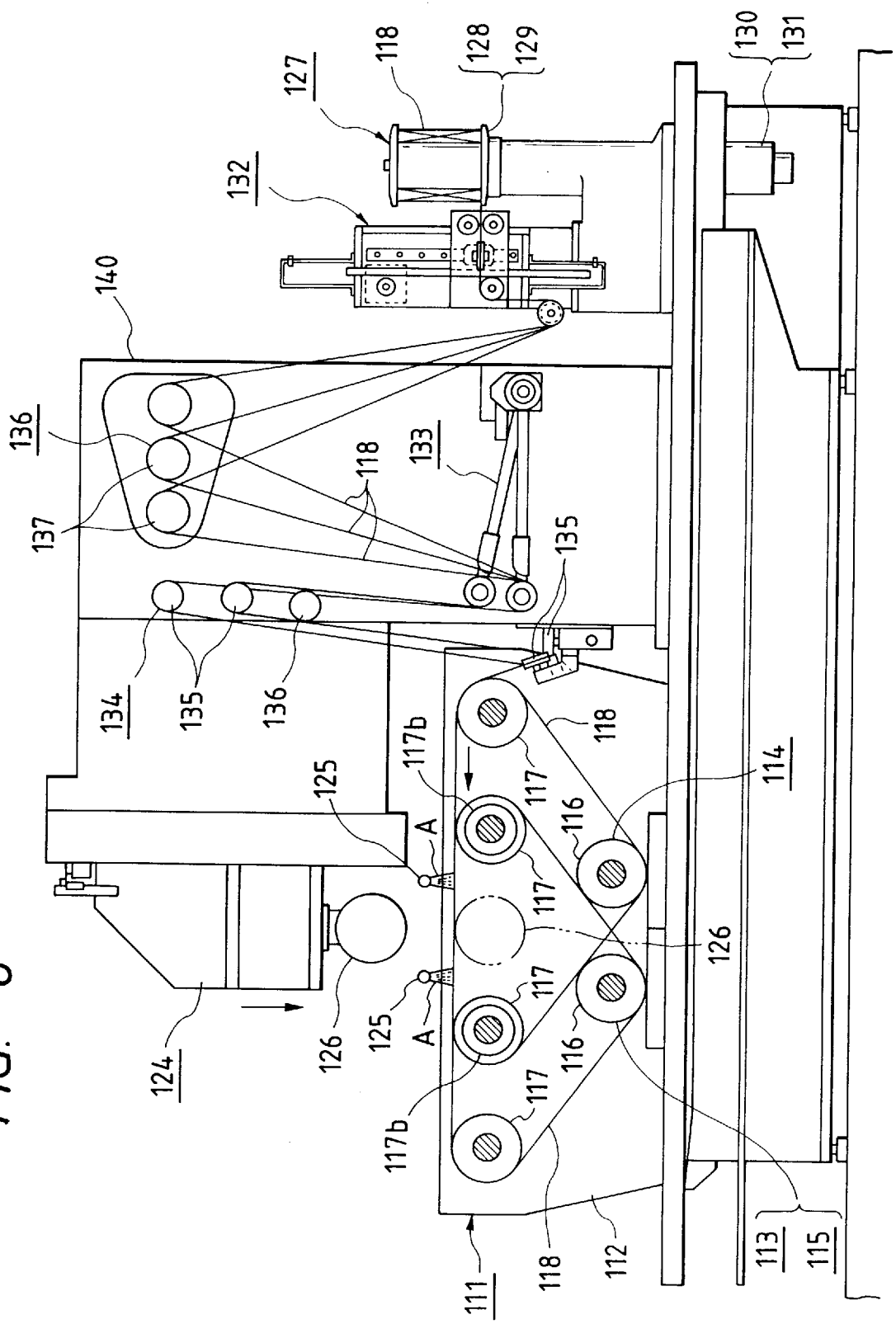
FIG. 6 is a front view of the fifth embodiment of the present invention.
Figure 7:
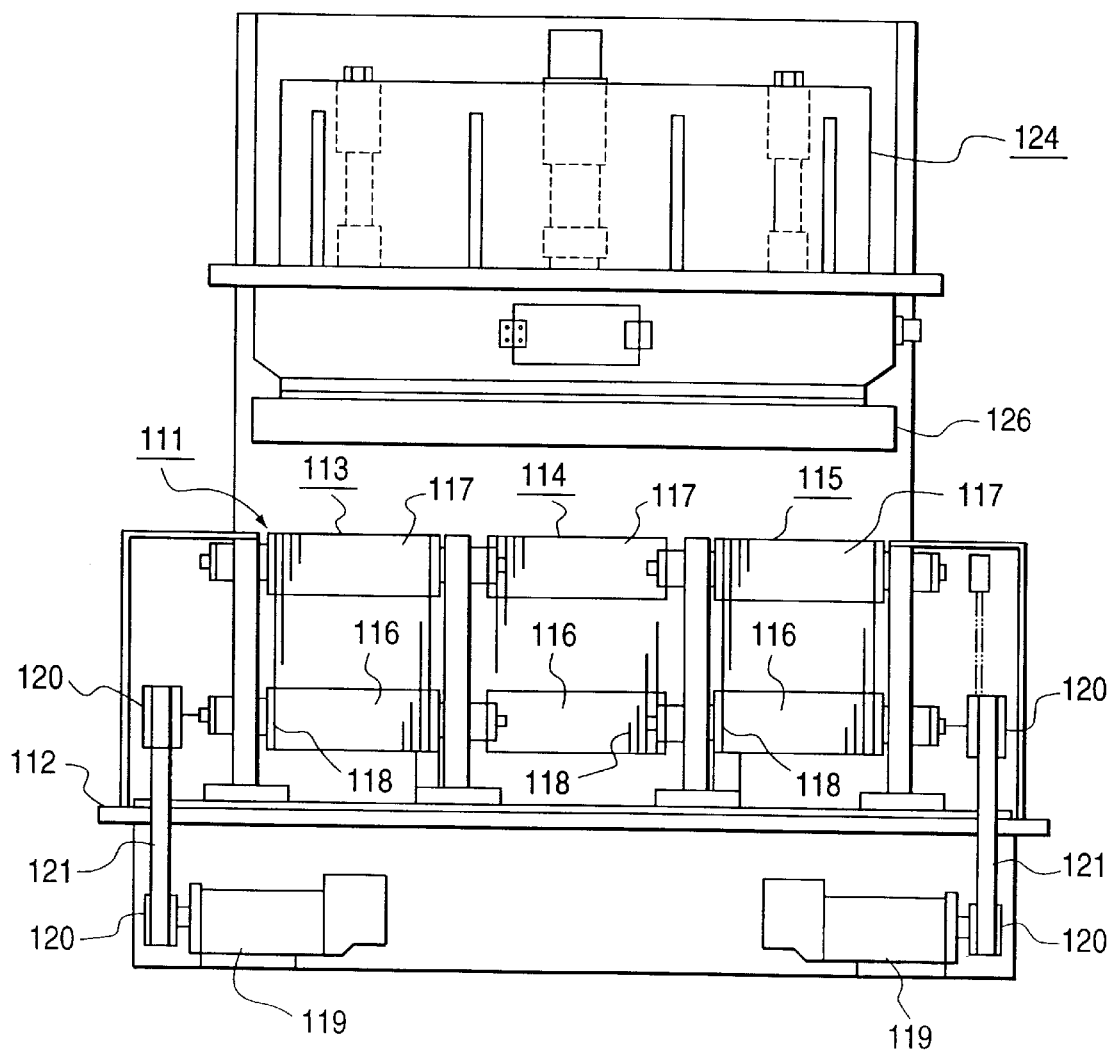
FIG. 7 is a side view of the fifth embodiment.
Figure 8:
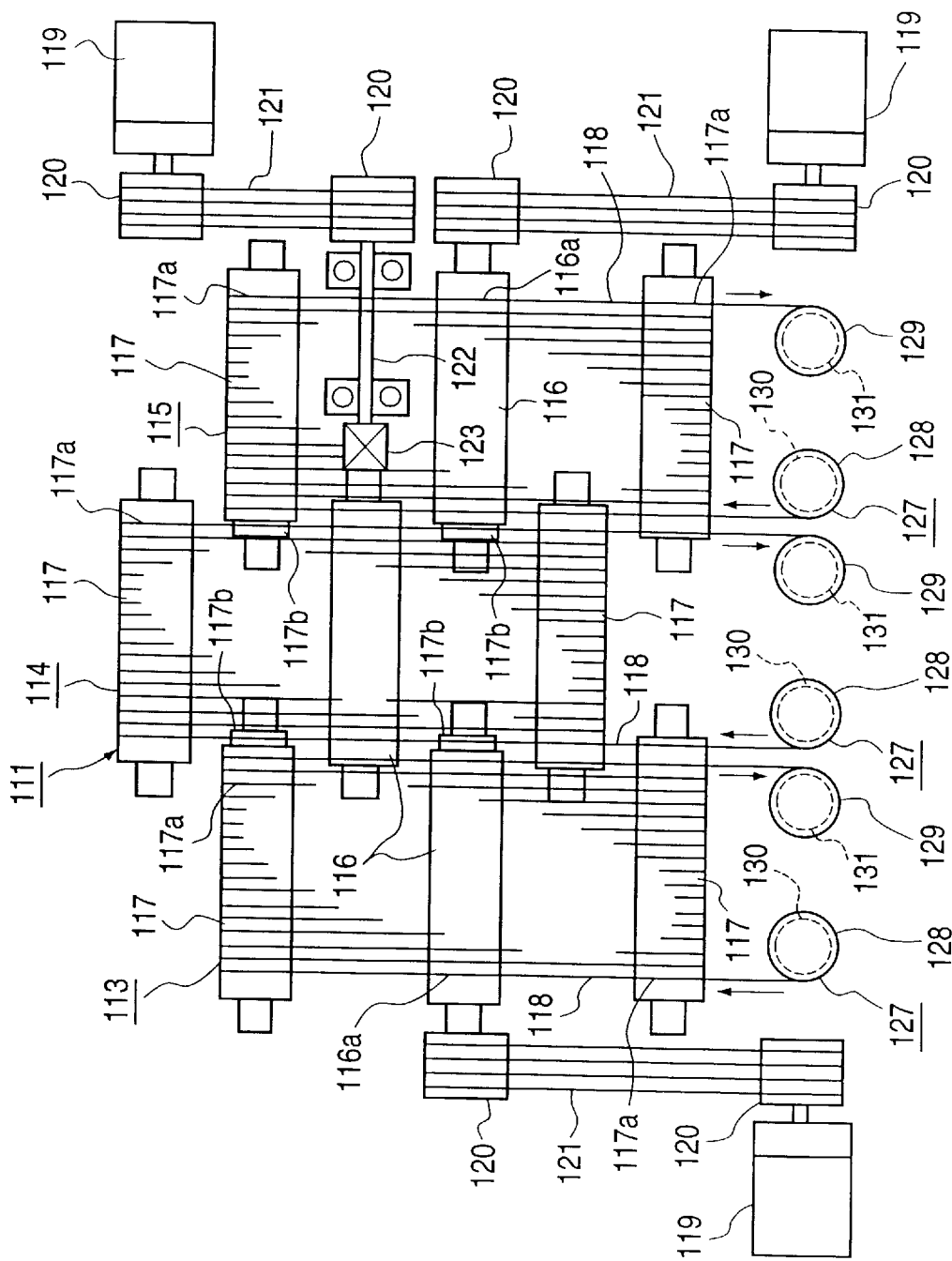
FIG. 8 is a schematic plane view showing the arrangement of machining rollers in the fifth embodiment.
Figure 9:
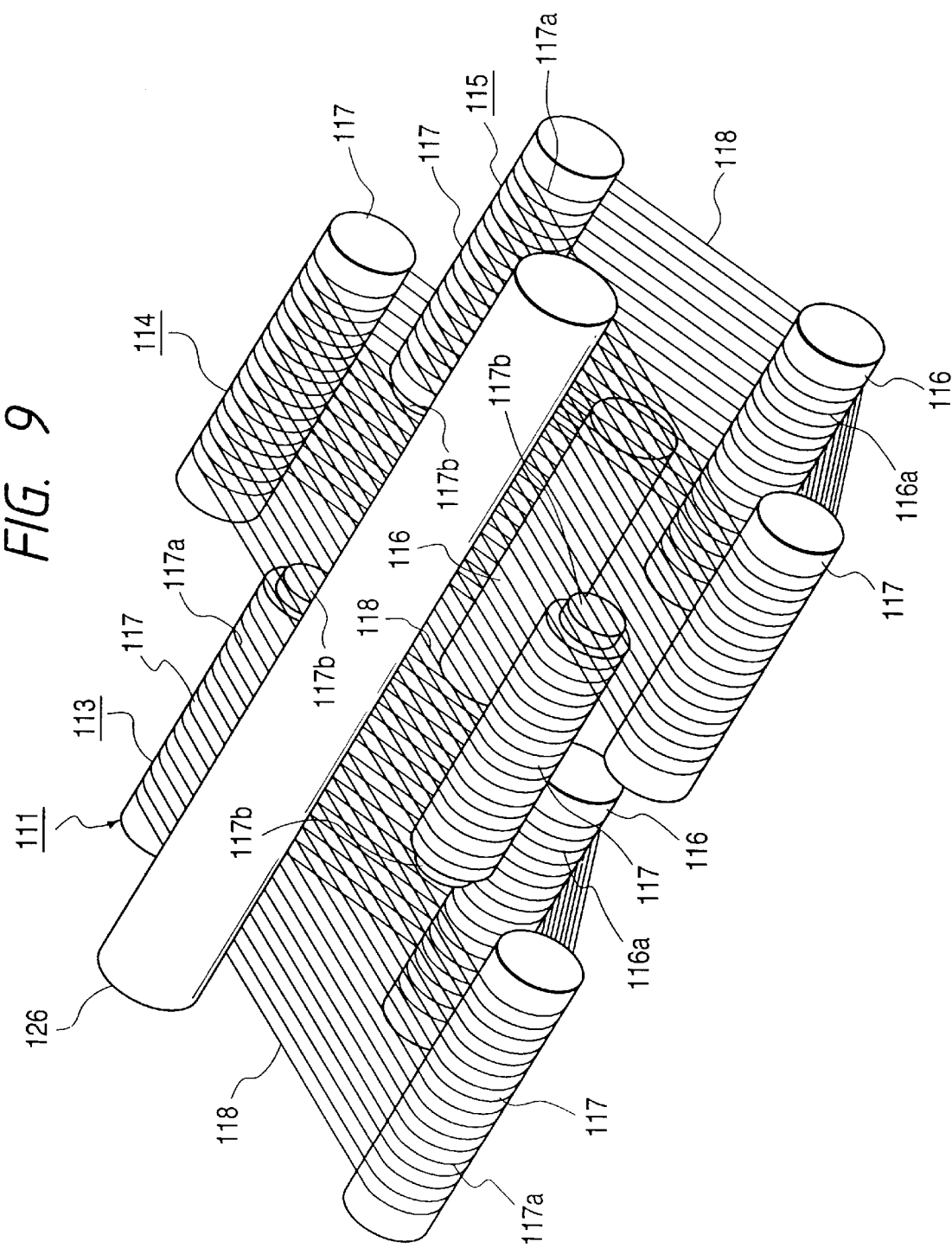
FIG. 9 is a schematic perspective view of the arrangement of machining rollers in the fifth embodiment.

Referring to FIG. 5, an explanation will be given of the fourth embodiment of the present invention.

In the wire saw according to this embodiment, the arrangement pitch P1 of the circular groove 13a and 14a on the machining rollers 13 and 14 is formed to vary stepwise for each prescribed interval in an axial direction of the rollers 13 and 14 between the inlet and outlet of each of the wires 15A and 15B. Specifically, the arrangement pitch P1 of the circular grooves 13a and 14a is changed by two steps so that the arrangement pitch P1a on the inlet side of each of the wires 15A and 15B is wider than the arrangement pitch P1b.

Therefore, like the third embodiment, while each of the wires 15A and 15B is shifted from the inlet side from the outlet side, it is abraded slightly to become slender. Even when the cutting thickness of the work 20 has an increasing tendency, the increasing amount of the cutting thickness will be canceled by a preset varying amount of the arrangement pitch P1 of the circular grooves 13a and 14a. Therefore, also between the one end and the other end of each of the wires 15A and 15B, the cutting thickness of the work 20 can be further suppressed from varying.

In the fourth embodiment, the arrangement pitches P1a and P1b of the circular grooves 13a and 14a on the machining rollers 13 and 14 are formed to vary stepwise in an axial direction of the rollers 13, 14. For this reason, the circular grooves 13a, 14a can be easily cut/sliced on the outer periphery of the machining rollers 13 and 14.

The present invention can be modified as follows.

(1) In the axial direction of the machining rollers 13 and 14, four or more flows of reel mechanisms 22A, 22B, 22C, . . . are arranged in parallel. The work 20 is cut/sliced in a sharing manner by four or more flows of wires 15A, 15B, 15C, . . . . Such a configuration can be cut with a higher precision.

(2) In the wire saw provided with three or more reels 22A, 22B, 22C . . . , as in the third embodiment, the arrangement P1 of the circular grooves 13a and 14a on the machiningrollers 13 and 14 may be varied continuously.

(3) In the wire saw provided with three or more reels 22A, 22B, 22C, . . . , as in the fourth embodiment, the arrangement P1 of the circular grooves 13a and 14a on the machining rollers 13 and 14 may be varied stepwise.

(4) In the wire saw according to the fourth embodiment, the arrangement pitch P1 of the circular grooves on the machining rollers 13 and 14 may be varied by plural steps of three or more between the inlet and outlet of each set of wires 15A and 15B.

The above configurations of (2), (3) and (4) can provide the same advantage as the above (1).

Now referring to the drawings, an explanation will be given of the fifth embodiment of the present invention.

As shown in FIGS. 6 to 9, a cutting mechanism 111 is mounted on an apparatus frame 112. The cutting mechanism 111 is provided with plural sets (three in the embodiment) of roller groups 113, 114 and 115 arranged in parallel in a longitudinal direction of a work (described later) in opposition thereto. Each roller group includes a single driving roller 116 for machining and two sub-rollers 117 for machining which are arranged in parallel. In each of the roller groups 113, 114 and 115, the rollers 116 and 117 are arranged in parallel so that the axial centers of the machining rollers 116 and 117 form a triangle. On the outer periphery of each of the rollers 116 and 117, circular grooves 116a and 117a are formed with a prescribed pitch. For easy understanding, a smaller number of grooves 116a and 117a than actually adopted are illustrated.

Each of wires 118 of three strip lines is continuously wound on the circular grooves 116a and 117a of the machining rollers 116, 117 individually in each of the roller groups 113, 114 and 115. In this embodiment, the wires 118 are arranged with the same pitch among the adjacent roller groups 113, 114 and 115. The arrangement pitch of the wires 118 is the same between the roller groups 113 and 114 and between the roller groups 114 and 115. The machining rollers 116 and 117 have portions 116b and 117b each having a slightly smaller diameter than that of their center potion.

Three wire travelling motors 119 are arranged on said frame 112. Each wire travelling motor 119 is coupled with the driving roller 116 in each roller group through a pulley 120 and belt 121, or otherwise the pulley 120, the belt 121, a coupling shaft 122 and a coupling 123. Each of these motors 119 drives the driving roller 116 in each of the roller groups 113, 114 and 115. Attendantly on the rotation of the driving motor 116, the wire 118 is travelled to rotate the sub-roller 117.

Since the predetermined machining rollers 116 and 117 have small diameter portions 116b and 117b at the ends, the wires 118 wound on the adjacent machining rollers 116 and 117 are not brought into contact with the ends of any of the machining rollers 116 and 117. Namely, the small diameter portions 116b and 117b serve as relief margins for preventing the wires 118 wound on the adjacent machining rollers 116 and 117 from being brought into contact with the ends of any of the machining rollers 116 and 117. Therefore, the diameters of the small diameter portions 116b and 117b may be set so that the wires 118 wound on the adjacent rollers 116 and 117 do not escape from the ends of the machining rollers 116 and 117 to be brought into contact with the ends of any of the rollers 116 and 117. Incidentally, since the small diameter portions 116b and 117b are provided to have the relief for the wires, they may be omitted if they are not in contact with the wires 118. Specifically, as seen from FIG. 8, the small diameter portions 116b and 117b at the areas where the wires 118 are not brought into contact with the ends of the machining rollers 116 and 117. Examples thereof are the small diameter portions 116b, 117b on the left side of the machining rollers 116, 117 of the left three machining rollers 116, 117, those of on the right side of the right three machining rollers 116, 117 and the small diameter portions 116b, 117b on both sides of the upper and middle ones of the center three machining rollers 116, 117.

Above the cutting mechanism 111, the work supporting mechanism 124 is supported on a column 140 provided upright so that it is movable vertically. Below the supporting mechanism 124, slurry supply tubes 125 are arranged. A work 126 of ingot of brittle material is removably set in the lower portion of the work supporting mechanism 124. A motor for rising or falling the work not shown is arranged on the column 140. The work supporting mechanism 124 is moved vertically through a ball screw (not shown) by the motor.

In the operation of the wire saw, while the wires 118 are travelled reciprocatively and bidirectionally between the machining rollers 116 and 117 in each of the roller groups 113, 114 and 115, the work supporting mechanism 124 is lowered towards the cutting mechanism 111. Then, a slurry A containing free abrasive grains is supplied from the slurry supply tube 125 on the wires 118, and the work 126 is pushed into contact with the wires 118. Thus, by the lapping operation of the free abrasive grains contained in the slurry, the work 126 is cut/sliced into wafers each having a prescribed thickness.

Three sets of reel mechanisms 127 are mounted on the frame 112 so as to correspond to the roller groups 113, 114 and 115. Each set of reel mechanism includes a supply reel 128 for supplying the wire 118 and a take-up reel 129 for taking up the wire 118. A pair of reel rotating motors 130 and 131, which may be servo motors, are arranged on the frame 112 for each set of reel mechanism. Their motor shafts are coupled with the reels 128 and 129. A traverse mechanism 132 is mounted on the frame 112 so that it is adjacent to each reel mechanism 127. The traverse mechanism 132 guides the supply of the wire from the supply reel 128 and the take-up of the wire to the take-up reel 129 so as to traverse them vertically. The supply and take-up of the wire are alternately periodically.

By rotation of both reels 128 and 129 of each reel mechanism 127, the wire 118 is supplied from the supply reel 128 to each of the roller groups 113, 114 and 115 stepwise in a manner of advance and retreat, e.g. advance of 10 meter and retreat of 9 meter. The wire after machining is taken up by the take-up reel 129. When the entire wire 118 on the supply reel 128 is passed through the cutting mechanism 111 and taken up by the take-up reel 129, the rotary direction of the reel rotating motors 130, 131 is changed so that the supply and take-up operation of the reels 128 and 129 are reversed to use the wire 118 repetitively.

A tension imparting mechanism 133 and a guide mechanism 134 are arranged between the reel mechanism 127 and the roller groups 113, 114 and 115 of the cutting mechanism 111. Both ends of the wire 118 wound between the machining rollers 116 and 117 in each of the roller groups 113, 114 and 115 is hung on the tension imparting mechanism 133 through each guide roller 135 of the guide mechanism 134. In this state, by the tension imparting mechanism 133, prescribed tension is applied to the wire 118 between the machining rollers 116 and 117 in each of the roller groups 113, 114 and 115.

A tension reducing mechanism 136 is arranged between the reel mechanism 127 and tension imparting mechanism 133 and provided with a pair of rotary rollers 137. The wire 118 is hung on the rollers 137. When three rollers 137 are rotated, the tension of the wire 118 spreading from the tension imparting mechanism 133 to the reels of the reel mechanism 127 is attenuated.

An explanation will be given of the wire saw configured as described above.

In the wire saw, in each of the roller groups 113, 114 and 115 of the cutting mechanism, the wire 118 is supplied form the supply reel 128 of the reel mechanism 127 and travelled reciprocatively bidirectionally intermittently between the machining rollers 116 and 117. Thereafter, it is finally taken up by the take-up reel 129. While the work supporting mechanism 124 supplies the slurry A containing free abrasive grains on the wire 118 between the machining rollers 116 and 117 in the roller group 113, 114 and 115, the work 126 is pushed into contact with the wire 118. Thus, the work 126 is cut/sliced into wafers each having a prescribed thickness.

In this way, in the wire saw, three sets of roller groups each having plural machining rollers 116, 117 are arranged oppositely to the work in a longitudinal direction thereof. The work 126 is cut/sliced simultaneously by wires 118 wound on the roller groups 113, 114 and 115. Thus, even when the work 126 which is long is set in the work supporting mechanism 124, it can be cut by the plural sets of roller groups 113, 114 and 115 in their sharing manner.

Since the machining rollers 116 and 117 in each of the roller groups 113, 114 and 115 are short, in cutting/slicing of the work, no great thermal distortion is generated in the rollers 116 and 117. No great variation is produced in the pitch of the circular grooves 116a and 117a. Accordingly, the work 126 which is long can be cut/sliced with a high precision, thereby making wafers each having a uniform thickness.

The meritorious effects which can be provided by this embodiment are as follows.

(a) The plurality of sets of roller groups 113, 114 and 115 are arranged in parallel in a longitudinal direction of the work. The work 126 is cut/sliced simultaneously by wires 118 wound on the roller groups 113, 114 and 115. Thus, the work 126 which is long can once be cut/sliced efficiently simultaneously by the plural sets of roller groups 113, 114 and 115, thereby shortening the time required for slicing.

(b) The plurality of sets of roller groups 113, 114 and 115 are arranged in parallel in a longitudinal direction of the work 126. For this reason, three short works 126 which are arranged correspondingly to these roller groups 113, 114 and 115 can be simultaneously cut/sliced efficiently.

(c) The machining rollers 116 and 117 for each of the roller groups 113, 114 and 115 are relatively short. No great thermal distortion will be generated in the machining rollers 116 and 117, and nor variation in the groove pitch will be also produced, thus cutting the work 126 into wafers each having a prescribed thickness with a high precision.

(d) The machining rollers 116 and 117 for each of the roller groups 113, 114 and 115 are relatively short. Therefore, the machining rollers 116 and 117, which must be exchanged when their surfaces have been worn out, can be easily exchanged for new machining rollers.

(e) Three wires 118 are individually wound on three sets of roller groups 113, 114 and 115. For this reason, in each of the roller groups 113, 114 and 115, if the pitch of the circular grooves 116a and 117a on the machining rollers 116 and 117, diameter of the wire 118 and tension thereof are set or changed optionally, the work which is long can be cut simultaneously into wafers having different thicknesses.

(f) In each of the roller groups 113, 114 and 115, the center axes of the machining rollers 116, 117 are arranged in parallel to form a triangle. Therefore, the tension of the wire 118 wound on the machining rollers 116, 117 can be easily maintained constant, thereby improving the machining accuracy of the work.

Figure 10:
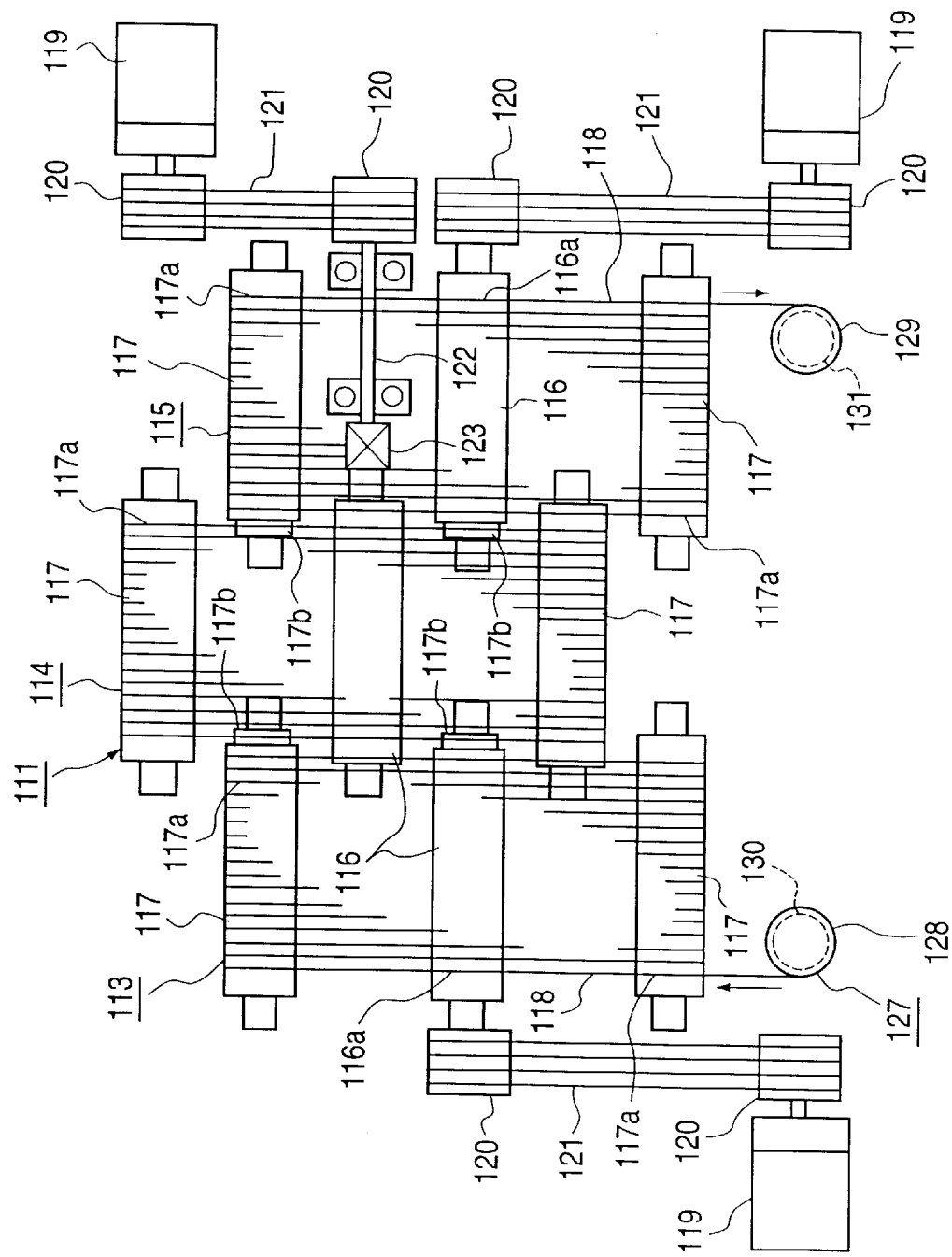
FIG. 10 is a schematic plane view of the arrangement of in the sixth embodiment.

Now referring to FIG. 10, an explanation will be given of the sixth embodiment of the present invention.

In this embodiment, a single wire 118 is wound in order on the roller groups 113, 114 and 115 so that it is extended over these roller groups 113, 114 and 115. Therefore, there is no need of providing the mechanisms related to the wire 118, e.g., the reel mechanism 127, traverse mechanism 132, tension imparting mechanism 133, guide mechanism 134, tension reducing mechanism 135, individually for each of the roller groups 113, 114 and 115. This permits the structure of the wire saw to be simple and miniaturized.

The present invention can be modified as follows.

(1) In the fifth embodiment, one or adjacent two of the roller groups 113, 114 and 115 of the cutting mechanism 111 may be driven so that the work 126 corresponding to one or two of the machining rollers 116 and 117 can be cut/sliced.

(2) In the fifth and sixth embodiments, the number of sets of the roller groups 113, 114 and 115 arranged in parallel can be changed into 2 or 4.

(3) In the fifth and sixth embodiments, the mechanism for driving the roller groups 113, 114 and 115 can be changed optionally. For example, the roller groups 113, 114 and 115 may be driven by a single wire travelling motor 119.

EFFECT OF THE INVENTION

The first and second aspect of the present invention, which is configured as described above, a single work can be cut/sliced by prescribed amounts in a sharing manner by plural flows of wires travelling between the machiningrollers. Thus, between the one end and the other end of the machiningroller, the cutting thickness of the work can be suppressed from varying.

In accordance with the present invention, since the single work can be cut/sliced by plural flows of wires, the cutting capability and coarse degree of the cutting plane can be suppressed from being varying between the one end and other end of the machining rollers.

Further, in accordance with the present invention, between the one end and the other end of the machining roller, the cutting capability does not vary so that the slicing speed of the work can be enhanced, thereby shortening the time required to cut/slice the entire work.

In accordance with the present invention, by varying the arrangement pitch of circular grroves for each of a plurality of machining rollers, the cutting thickness of the work can be suppressed from varying between the wire inlet and the wire outlet of said machining rollers.

In accordance with the third aspect of the present invention, the work which is lengthy can be cut into a large number of wafers simultaneously with a high precision.

Further, in the present invention, the size of the machining rollers in each roller group, diameter of the wire and tension thereof can be set or changed optionally, so that the work which is long can be cut simultaneously into wafers having different thicknesses. Since a new wire can be supplied for the work, the cutting efficiency of the work can be improved.

In accordance with the invention, the reel mechanism for supply and take-up of the wire may not be required individually for each of the roller groups, so that the structure of the wire saw can be simplified and miniaturized.

In the invention, the diameter at the end of said machining roller may be made smaller than that at the center, so that the wire wound on the adjacent machining rollers can be prevented from being brought into contact with the end of any of the machining rollers.

What is claimed is:

1. A wire saw comprising:
    a plurality of wires each supplied from a supply reel and taken up by a take-up reel; and
    a plurality of machining rollers each having an outer periphery having a plurality of grooves for guiding respective portions of said plurality of wires as they travel between said machine rollers during a cutting operation
    wherein a single work is cut through a lapping operation of abrasive grains, and said plurality of wire portions which travel between said machining rollers are provided to simultaneously effect a cutting operation,
    wherein each of said plurality of wires is used to effect a cutting operation of more than one slice of the single work, and
    wherein an arrangement pitch of grooves for each of said machining rollers is varied along an axial direction of each of said machining rollers.

2. A wire saw according to claim 1, wherein the arrangement pitch of said grooves for each of said machining rollers is varied continuously in the axial direction of each of said machining rollers.

3. A wire saw according to claim 2, wherein the grooves are spaced apart in accordance with a predetermined pattern so as to partially offset a tendency of the wire saw to change a thickness of cut slices of the work in the axial direction of the machining rollers.

4. A wire saw according to claim 1, wherein the arrangement pitch of said grooves for each of said machining rollers is varied stepwise for each of prescribed intervals in the axial direction of each of said machining rollers.

5. A wire saw according to claim 4, wherein the grooves are spaced apart in accordance with a predetermined pattern so as to partially offset a tendency of the wire saw to change a thickness of cut slices of the work in the axial direction of the machining rollers.

6. A wire saw according to claim 1, wherein said machining rollers are arranged into a plurality of sets of roller groups, and wherein each of said sets of roller groups is spaced apart from the other of said sets of roller groups in an axial direction of said machining rollers.

7. A wire saw according to claim 6, wherein respective diameters of ends of said machining rollers are made smaller than that of respective center portions of said machining rollers in the axial direction thereof.

8. A wire saw according to claim 7, wherein a smaller diameter end of at least one of said machining rollers in one of said plurality of sets of machining rollers, defining a first end, overlaps in the axial direction of said machining rollers with an end of another machining roller in another of said plurality of sets of machining rollers, defining a second end, and wherein a cutting wire portion guided by a groove in said second end travels over said first end during the cutting operation without contacting said first end.

9. A wire saw according to claim 6, wherein each of said sets of roller groups is separately supported by a corresponding set of support members, and wherein each of said sets of roller groups is spaced apart from the other of said sets of roller groups so that a thickness of cut slices from said single work at a position corresponding to a transition from one set of roller groups to another equals a thickness of a remaining cut slices of said work.

10. A work slicing method in a wire saw which comprises: a plurality of wires each supplied from a supply reel and taken up by a take-up reel and a plurality of machining rollers each having an outer periphery having a plurality of grooves for guiding respective portions of said plurality of wires as they travel between said machine rollers during a cutting operation in such a manner that a single work is cut through a lapping operation of said abrasive grain, wherein each of said plurality of wires is used to effect a cutting operation of more than one slice of the single work and an arrangement pitch of grooves for each of said machining rollers is varied along an axial direction of each of said machining rollers; said work slicing method comprising the steps of:
    cutting said single work by simultaneously using said plurality of wire portions which travel between the machining rollers and by using each of said plurality of wires to effect a cutting operation of more than one slice of the single work.

11. A wire saw comprising: at least one wire wound with a prescribed pitch between a plurality of machining rollers; wherein said machining rollers are arranged into a plurality of sets of roller groups, and wherein each of said sets of roller groups is spaced apart from the other of said sets of roller groups in an axial direction of said machining rollers.

12. A wire saw according to claim 11, wherein a plurality of wires are individually wound around the plurality of sets of roller groups.

13. A wire saw according to claim 11, wherein a single wire is wound over the plurality of sets of roller groups.

14. A wire saw according to any one of claims 11 to 13, wherein respective diameters of ends of said machining rollers are made smaller than that of respective center portions of said machining rollers in the axial direction thereof.

15. A wire saw according to claim 11, wherein each of said sets of roller groups is separately supported by a corresponding set of support members, and wherein each of said sets of roller groups is spaced apart from the other of said sets of roller groups so that a thickness of cut slices from said single work at a position corresponding to a transition from one set of roller groups to another equals a thickness of a remaining cut slices of said work.

16. A wire saw comprising:

at least one wire wound with a prescribed pitch between a plurality of machining rollers;

wherein said machining rollers are arranged into a plurality of sets of roller groups, and wherein each of said sets of roller groups is spaced apart from the other of said sets of roller groups in an axial direction of said machining rollers; and wherein each of said sets of roller groups is disposed so as to cut a different portion of the work than the other of said sets of roller groups.

17. A wire saw according to claim 1, wherein the grooves are spaced apart in accordance with a predetermined pattern so as to partially offset a tendency of the wire saw to change a thickness of cut slices of the work in the axial direction of the machining rollers.

* * * * *